United States Patent [19]

Stickel

[11] Patent Number: 4,597,740

[45] Date of Patent: Jul. 1, 1986

[54] METHOD FOR SIMULATION OF A VISUAL FIELD OF VIEW

[75] Inventor: Robert Stickel, Neu Isenburg, Fed. Rep. of Germany

[73] Assignee: Honeywell GmbH, Offenbach, Fed. Rep. of Germany

[21] Appl. No.: 443,093

[22] Filed: Nov. 19, 1982

[30] Foreign Application Priority Data

Aug. 27, 1981 [DE] Fed. Rep. of Germany ..... 31338895

[51] Int. Cl.[4] ................................................ G09B 9/00
[52] U.S. Cl. .......................................... 434/20; 434/43
[58] Field of Search ...................................... 434/20–22, 434/43, 44; 273/310–312, 348.1; 358/104

[56] References Cited

U.S. PATENT DOCUMENTS

| | | | |
|---|---|---|---|
| 3,508,751 | 4/1970 | Meyer et al. | 273/310 |
| 3,810,138 | 5/1974 | Thompson et al. | 340/728 |
| 4,086,711 | 5/1978 | Gammarino et al. | 273/310 |
| 4,209,832 | 6/1980 | Gilham et al. | 434/20 |
| 4,279,599 | 7/1981 | Marshall et al. | 273/348.1 |
| 4,340,370 | 7/1982 | Marshall et al. | 273/312 |
| 4,405,132 | 9/1983 | Thalmann | 273/348.1 |
| 4,470,818 | 9/1984 | Marshall | 434/22 |

*Primary Examiner*—Richard C. Pinkham
*Assistant Examiner*—Leo P. Picard
*Attorney, Agent, or Firm*—Roger W. Jensen

[57] ABSTRACT

Figure 2:
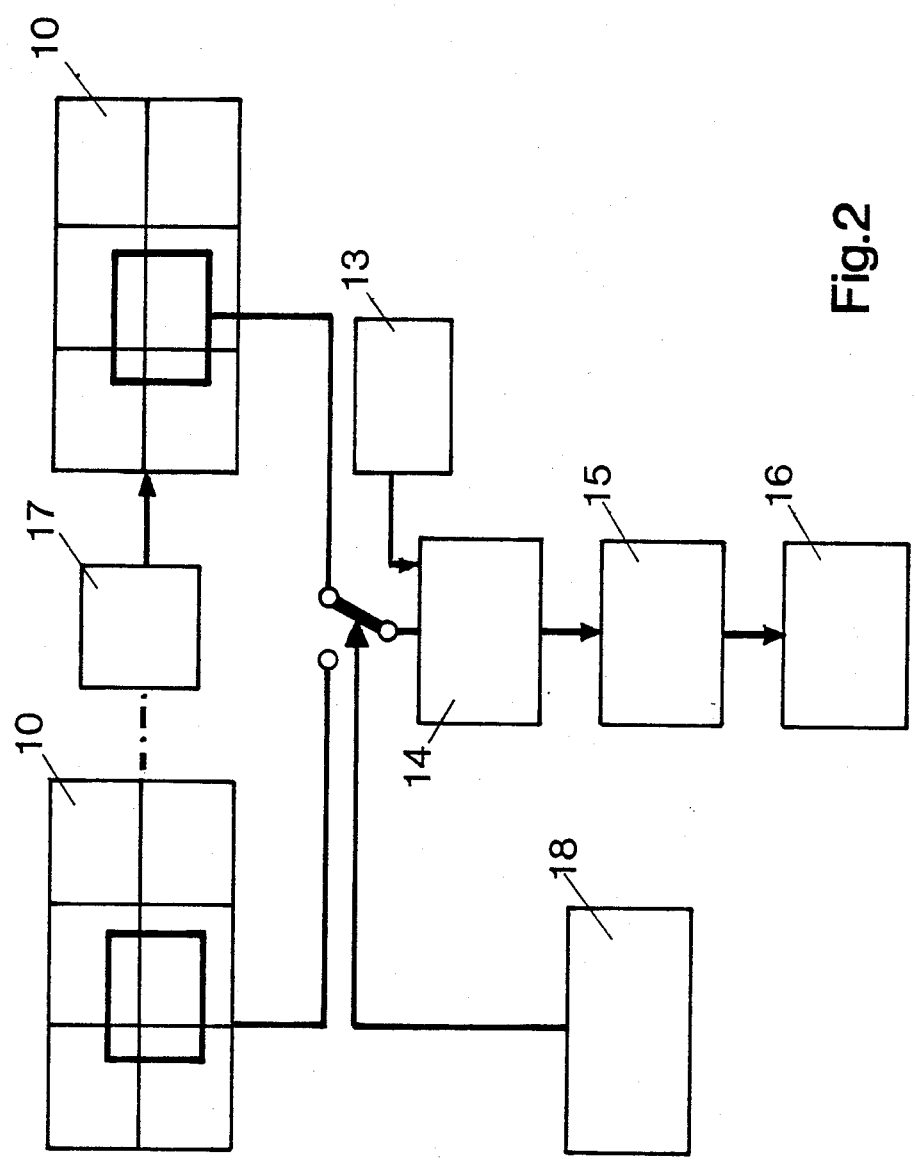

At the simulation of a visual field of view for training of a battle situation, the image of the background is displayed on a TV-monitor (16) which is arranged in the field of view of the optics of a person to be trained and moveable targets are cut in in the background image. The background image as well as the target image are digitally stored and are displayed on the monitor after conversion into a video signal. In order to simulate a thermal image on the monitor, the gray scale levels of a daylight video picture of the background image point by image point are treated with an evaluation function which may be obtained for instance by comparing the daylight video picture with a true thermal picture. The thermal image representation of the cut-in targets for instance may be generated by a computer (FIG. 2).

6 Claims, 7 Drawing Figures

METHOD FOR SIMULATION OF A VISUAL FIELD OF VIEW

The present invention relates to a method for simulation of a visual field of view according to the preamble of claim 1. Such methods especially are used on devices for training of a battle situation.

From DE-PS No. 28 03 101 for instance it is known to produce a monitor image as a random partial cut-out from an overall image. The selection of the partial cut-out herewith is done by address means which, for instance, are coupled with control handles. This allows calling up of portions of individual images which may be put together to a partial cut-out from the overall image. According to DE-OS No. 29 19 047, these individual images also may be digitally stored and it is possible to cut in silhouettes or images of certain objects as for instance of moveable targets into the background image which is displayed on the monitor according to the addressed partial cut-out. The generation of those silhouettes or images is done by a computer in a known manner. If such a monitor is arranged in the field of view of the optics of a gunner or commander, then it is possible to simulate for instance a battle situation for tank crews.

In recent times, thermal imaging devices are prevailing especially in the field of target reconnaissance; this means devices which are operated in the infrared spectrum instead of the optical visual spectrum. Those thermal imaging devices in general are TV-compatible since they have similar scanning structures as the usual TV images, i.e. they are structured in lines and within the lines in gray scale levels whereat the gray scale levels are related to the received infrared radiation of the scene.

It is the object of the present invention to develop the previously mentioned method in such a way that at the simulation of a visual field of view, a display according to a thermal image may be produced in a relatively simple manner. This object is achieved according to the method characterized in claim 1. Further advantageous embodiments of the method according to the invention may be taken from the dependent sub-claims.

Furtheron it is known from DE-PS No. 19 51 622 to aim an optics viewing into a model landscape by means of control handles and to image additionally into the optical beam the image of a cathod ray tube whereat on the screen of the cathod ray tube the trajectory of a projectile is displayed.

It is the further object of the present invention to allow also at this method with the direct view into a model landscape a simulation of a visual field of view with the impression of a thermal image. This object is achieved by the method characterized in claim 7. Further embodiments of this method may be taken from the claims dependent on that claim.

The advantages of the solution according to the invention are to be seen in the fact that for performing the method on a training device this device must not be provided with a thermal imaging device which in most of the cases would not be possible due to space restrictions and which is prohibitive by reasons of costs.

Figure 1:
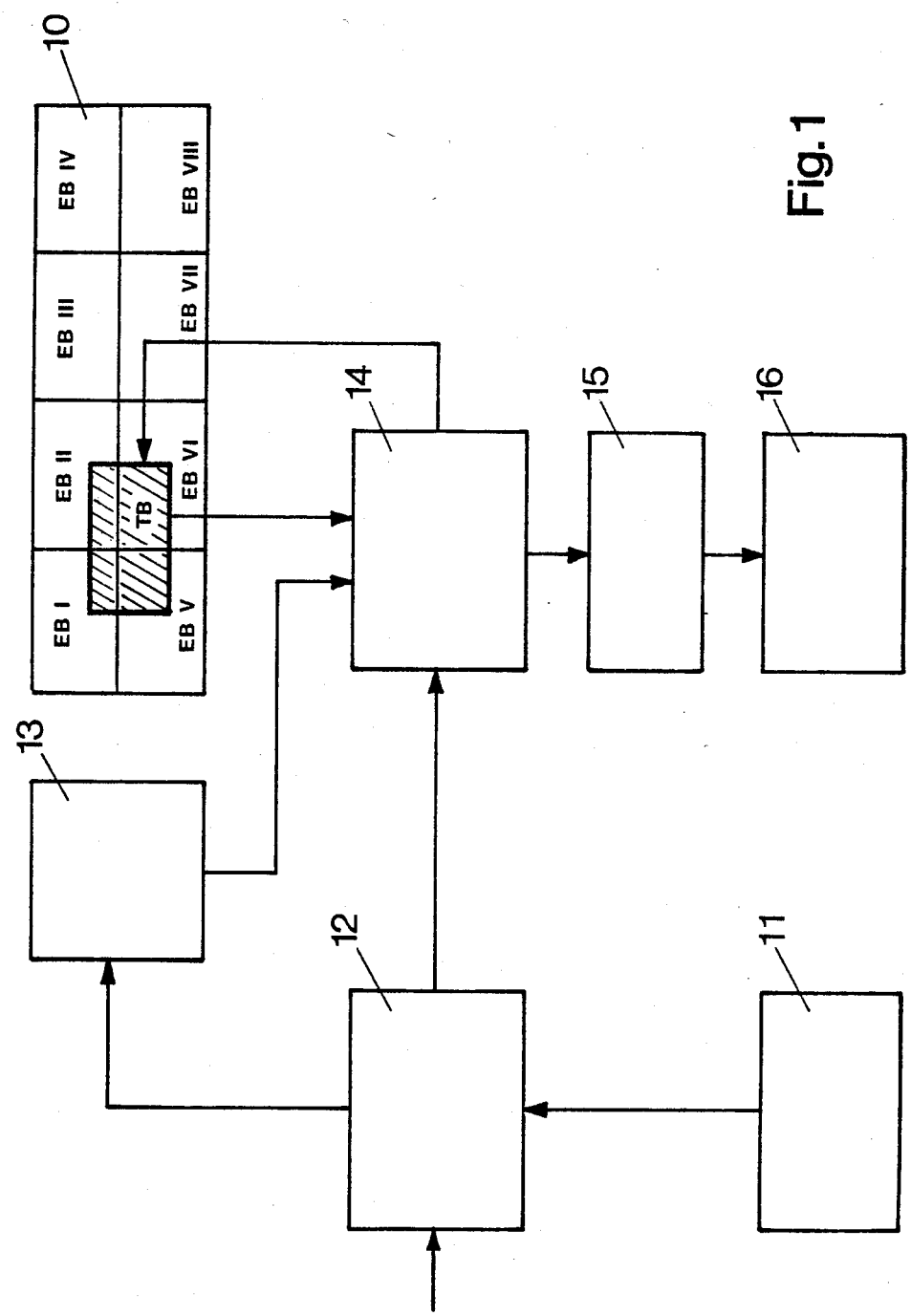
Figure 3:
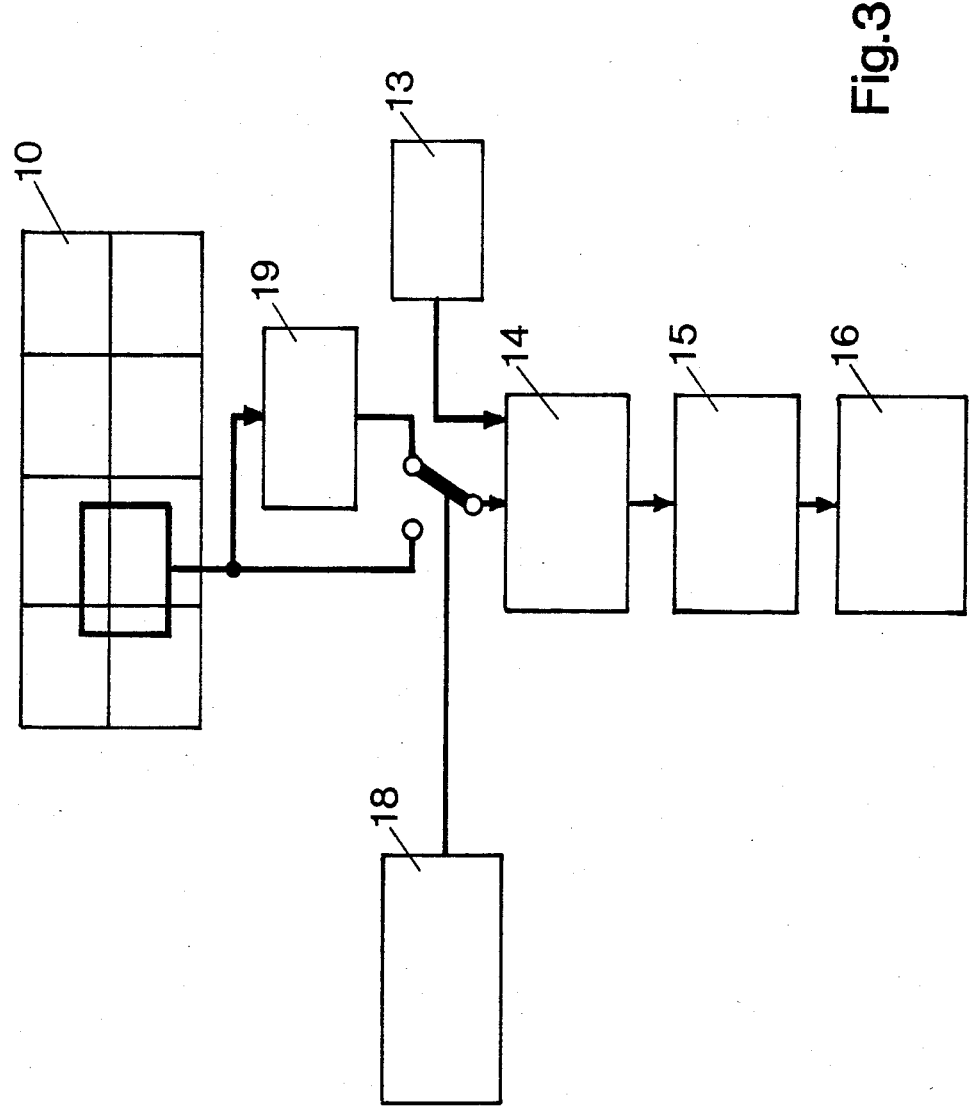
Figure 4:
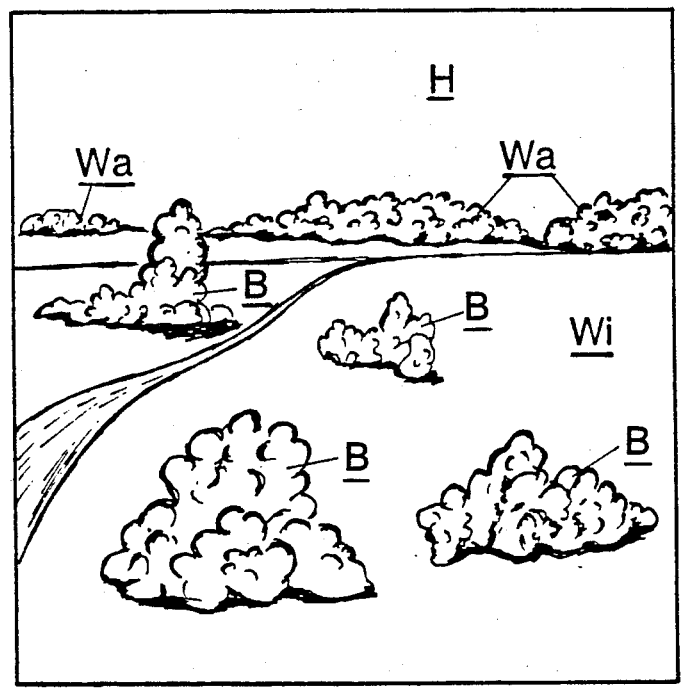
Figure 5:
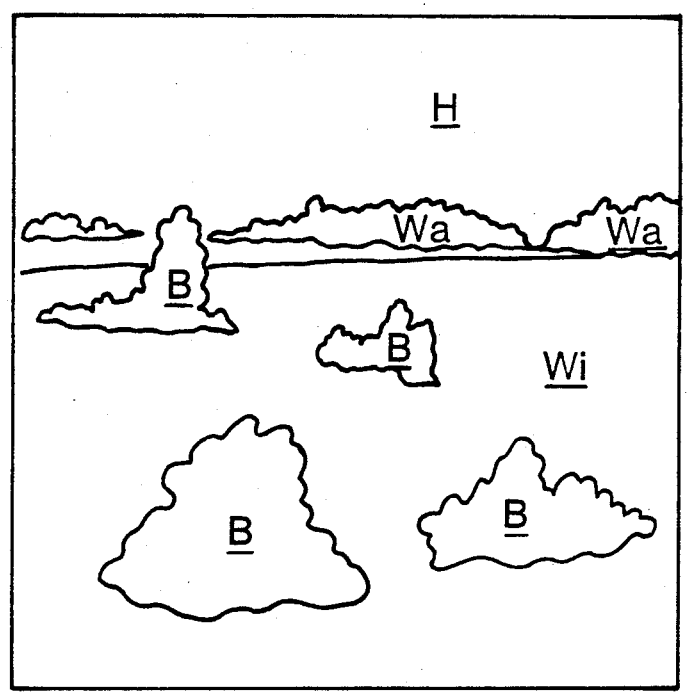
Figure 6:
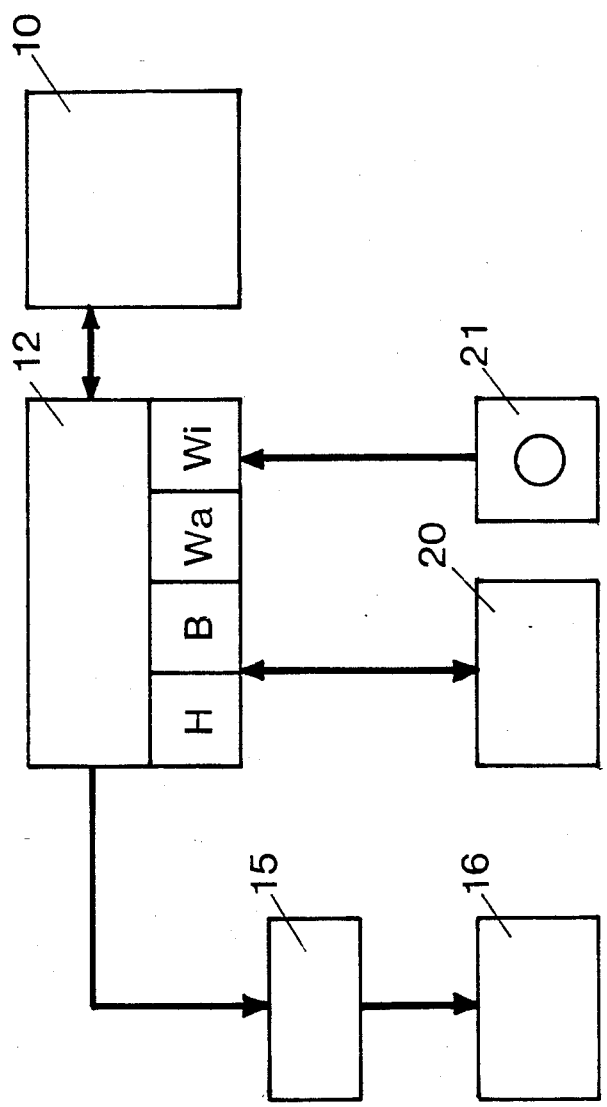
Figure 7:
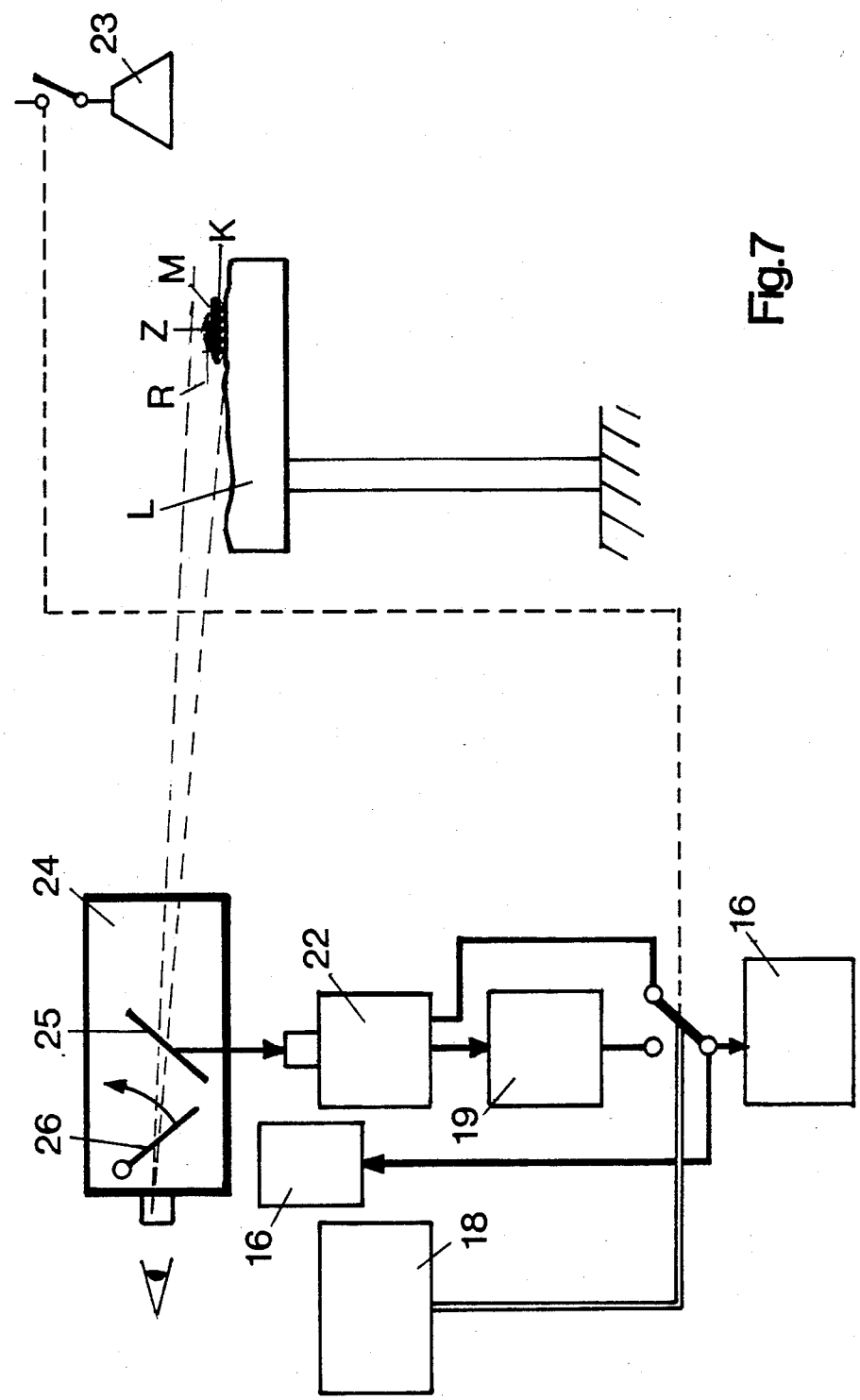

With respect to embodiments shown in the figures of the attached drawing, in the following the invention shall be explained in detail. It shows:

FIG. 1 a block diagram to illustrate the used CSI-method (CSI=Computer Synthesized Imagery);

FIG. 2 a block diagram of a first embodiment of the invention;

FIG. 3 a block diagram of a second embodiment of the invention;

FIG. 4 an image of a background with individual objects;

FIG. 5 a sketched out image of the same background;

FIG. 6 a block diagram of a device for evaluation of individual objects with an evaluation function; and FIG. 7 a block diagram of a further embodiment of the invention.

According to FIG. 1, a digital image memory 10 contains the digitally converted information of a video overall image. By adressing, which especially is done by control handles 11, it is possible to call up a partial image TB from an overall image EBI-EBVIII being stored in the image memory 10. The partial image TB for instance is put together of a plurality of individual images EBI, EBII, EBV, EBVI as it has been described in DE-PS No. 28 03 101 and DE-OS No. 29 19 047.

A processor 12 due to an inputted training program selects a digital target representation from a digital target memory 13 and it controls an image mixer 14 in such a manner that the digital target image is cut in into the digital partial image. The image mixed in this way is displayed on a monitor 16 after digital/video conversion in a converter 15. The monitor 16 in a manner not shown is arranged in the field of view of a sight optics whereat, for an optimum image quality, the TV image is optically matched in such a way that the field of view of the optics corresponds to the size of the screen.

According to FIG. 2, a device is shown which essentially corresponds to the device in FIG. 1 and which allows by means of a selctor switch 18 to operate arbitrarily with the daylight video image or with a thermal video image produced by a device 17 by means of an evaluation. The device 17 in priciple may be provided by the processor 12 which for instance in a read-only memory is storing the evaluation function. The thermal video image is a simulated thermal image which is produced as follows:

For representation of the thermal image of a scene in nature, first a daylight video picture is taken from this scene and, after digitizing, is stored in a daylight video memory 10. Then, by means of an evaluation function stored in the device 17, the grey scale levels of that daylight video picture are converted image point by image point in such a way that, after conversion, the image displayable to the human eye is similar to the thermal image of the same scene. The image information converted by means of the evaluation function is stored in a thermal video memory 10'. The evaluation function itself may be for instance produced by comparing point by point the gray scale levels of a daylight video image with the gray scale levels of a true thermal image of the same scene whereafter, by means of classifying methods and statistical distributions, the parameters of the evaluation function are computable.

Whereas according to FIG. 2, the thermal image is produced by an off-line processing of the individual image points in a computer and by a treatment with an evaluation function, whereafter the daylight video image as well as the thermal video image alternatively are available for a real time simulation of a visual field of view, the device according to FIG. 3 offers the possibility of an on-line conversion of the background image stored in the digital daylight video memory 10. By actuating the selector switch 18, the image mixer 14 may be connected to a look-up table 19 to which the digital daylight video information is applied, whereat each image point is treated again with the achieved evaluation function. The look-up table 19 again may be provided by the processor 12 which, for instance, in a read-only memory stores the evaluation function. Obviously, the look-up table also may be implemented by an electronic circuit.

FIG. 4 shows an example of a background image which essentially is composed from sky H, forest Wa, bushes B and a meadow Wi. Instead of assuming a uniform evaluation function for the whole image with which function the gray scale levels of a daylight video image are converted into a thermal video image according to a further embodiment of the invention, it is proposed each of the individual objects in the background image as sky H, forest Wa, bushes B and meadow Wi to evaluate with a specific evaluation function. For this purpose, according to FIGS. 5 and 6, an image point on the margin of an individual object H, B, Wa, Wi is unblanked in the partial image called up by means of a panel 20. The unblanked image point is displaced by a control device 21 (i.e. track ball) on the contour of the individual object. After detouring of the individual object, all image points within the margin are converted by an evaluaton function being characteristic for the individual object H, B, Wa and Wi. These evaluation functions may be stored in look-up tables within the processor 12 as it is shown in FIG. 6 or they may be implemented by an electronic circuit.

Concerning the targets cut in into the image of the background, the thermal video images of such targets are quite different from daylight video images. Hot exhaust ports, chains or barrels, warmed up by shots, for instance represent very exposed spots of a tank and therefore another method must be chosen to represent a simulated thermal image. As mentioned before, at a daylight simulation of a visual field of view, the targets are displayed in the video image by cutting in. The source for the target representation, for instance, is given by a target image which is evaluated by a computer in real time. This method is known as CGI method (CGI=Computer Generated Image). However, it is also possible to compute not in real time the target image in individual TV frames, to store them in a memory and to call them up in real time when recording. In both cases, the source of the target image forms the data base which describes the geometrical shape of the target by means of an appropriate number of points on the surface of the shape. This characerization, that is, the data base now may be equally chosen for the daylight image and the simulated thermal image; only with respect to the thermal image, individual data in the data base are completed in such a way that the corresponding aera of an exposed spot at the computation of the target display for the simulated thermal image is computed with a brightness differing from that of daylight image.

The previous discussed method for simulating of a thermal imaging apparatus is not restricted to the use on trainers on which the simulation of a visual field of view is achieved by means of the CSI method. According to FIG. 7, the impression of a thermal image may also be produced at a direct view into a model landscape L with target models Z moving in that landscape. Normally, an operator by means of a sight optics 24 which is aimed by control handles looks into the model landscape L in which the targets Z are moving. By means of a beam splitter mirror 25 arranged in the optical path of the sight optics 24, the image viewed by the gunner is deflected and applied to a video camera 22. The video image taken by the video camera 22 may be displayed on a monitor 16 if a switch actuated by a switch selector 18 takes the shown position so that for instance an instructor may monitor the aiming motion caused by a person to be trained.

If now a battle situation, i.e. the target reconnaissance and the combat shall be trained under use of a certain image display, then the following measures are necessary: the target Z moveable in the model landscape L is provided with a fluorescent colour at exposed spots, i.e. especially at the hot spots which are presented by the barrel R, the motor M and the chains K. At commutation to a simulated thermal imaging device by means of the selector switch 18, on one hand a UV-bulb 23 is switched on which is arranged above the model landscape L and on the other hand, the monitor 16 is connected to an analog look-up table 19. The video signal of the camera 22 is applied to that look-up table in order to treat the gray scale levels of the daylight video picture with an evaluation function being set up in advance. At the same time, the picture of the monitor 16 respectively of a further monitor 16' is imaged into the sight 24 of the gunner by means of a folding mirror 26. The folding mirror 26 is tilted away from the beam path if the battle situation shall be trained with a radiation in the visual spectrum. At the same time, the UV-bulb 23 must be switched off and the look-up table 19 must be skipped around.

I claim:

1. Method for simulation of a visual field of view, whereat for training of a battle situation the image of a background is displayed on a TV monitor in the field of view of the optics of a person to be trained and the image of a moveable target is cut in in that background and whereat the image of the background as well as the image of the target are digitally stored and are displayed after conversion into a video signal, characterized in that the gray scale levels of a daylight video picture of the background image point by image point are converted with a factor given by an evaluation function in order to produce a display according to a thermal image.

2. Method according to claim 1, characterized in that individual objects in the daylight video picture of the background are converted by means of an evaluation function specifically related to them.

3. Method according to claims 1 or 2, characterized in that the evaluation function is obtained by comparing image point by image point the grey scale levels of a daylight video picture with the grey scale levels of a true thermal image of the same background.

4. Method according to claim 1, characterized by an off-line conversion of the daylight video picture and by storing that picture in a thermal video memory separated from the daylight video memory.

5. Method according to claim 1, characterized by an on-line conversion of the daylight video picture by means of a hardware look-up table storing the evaluation function and being arranged between the daylight video memory and a monitor.

6. Method according to claim 1, characterized in that the data base of a target image to be cut in into the background image is changed with respect to exposed spots in order to emphasize the areas related to the exposed spots at simulation of the thermal image.

* * * * *